(12) United States Patent
Chen

(10) Patent No.: US 6,473,391 B1
(45) Date of Patent: Oct. 29, 2002

(54) OPTICAL DISK

(75) Inventor: I-Ming Chen, Taipei (TW)

(73) Assignee: Computech International Ventures Limited, Tortola (VG)

( * ) Notice: Subject to any disclaimer, the term of this patent is extended or adjusted under 35 U.S.C. 154(b) by 105 days.

(21) Appl. No.: 09/624,915

(22) Filed: Jul. 24, 2000

(30) Foreign Application Priority Data

May 17, 2000 (TW) ...................................... 89208295 U

(51) Int. Cl.[7] .............................. G11B 3/70; G11B 5/84; G11B 7/26
(52) U.S. Cl. ........................................................ 369/290
(58) Field of Search ................................. 369/290, 289, 369/272, 282, 273; 360/131, 135

(56) References Cited

U.S. PATENT DOCUMENTS

| | | | | |
|---|---|---|---|---|
| 2,694,578 A | * | 11/1954 | Smith | 369/273 |
| 3,039,218 A | * | 6/1962 | Whiting et al. | 283/117 |
| 3,644,032 A | * | 2/1972 | Dimitracopoulos | 353/120 |
| 4,829,510 A | * | 5/1989 | Takahashi | 369/271 |
| 5,867,477 A | * | 2/1999 | Naito et al. | 369/290 |
| 5,982,736 A | * | 11/1999 | Pierson | 369/273 |
| 6,285,651 B1 | * | 9/2001 | Boutaghou et al. | 369/270 |

* cited by examiner

*Primary Examiner*—Robert S. Tupper
*Assistant Examiner*—Julie Anne Watko
(74) *Attorney, Agent, or Firm*—Finnegan, Henderson, Farabow, Garrett & Dunner, L.L.P.

(57) ABSTRACT

An optical disk includes a disk body and a cap body. The disk body has a first surface adapted to be printed thereon, a second surface opposite to the first surface and adapted to store optical data, and a central through hole extending from the first surface through the second surface and confined by an annular hole surface. The disk body further has a cap seat flange that extends radially and inwardly from the hole surface and that is formed with a plurality of mounting holes therethrough. The cap body includes a cap plate disposed in the through hole. The cap plate has a top side adapted to be printed thereon, a bottom side, and a peripheral portion on top of the cap seat flange. The cap body further includes a plurality of hooking arms that extend from the peripheral portion at the bottom side and that extend slidably through the mounting holes.

5 Claims, 3 Drawing Sheets

OPTICAL DISK

BACKGROUND OF THE INVENTION

1. Field of the Invention

The invention relates to an optical disk, more particularly to an optical disk that includes a disk body and a cap body, both of which are adapted to be printed thereon.

2. Description of the Related Art

FIGS. 1 and 2 illustrate two conventional optical disks 4, 5. The conventional optical disk 4 is circular, whereas the conventional optical disk 5 is rectangular. Each of the conventional optical disks 4, 5 has a surface adapted to be printed thereon. Each of the conventional optical disks 4, 5 further has a central through hole 40, 50 for extension of a rotary driving shaft (not shown) of an optical disk reader.

Due to the presence of the through holes 40, 50, the area of the conventional optical disks 4, 5 that can be printed is relatively small, and the picture that is printed on the surface of the optical disks 4, 5 is not complete.

SUMMARY OF THE INVENTION

Therefore, the object of the present invention is to provide an optical disk that includes a disk body and a cap body, both of which are adapted to be printed thereon to result in a larger printable area.

According to the present invention, the disk body of an optical disk has a first surface adapted to be printed thereon, a second surface opposite to the first surface and adapted to store optical data, and a central through hole extending from the first surface through the second surface and confined by an annular hole surface. The disk body further has a cap seat flange that extends radially and inwardly from the hole surface and that is formed with a plurality of mounting holes therethrough.

The cap body of the optical disk includes a cap plate disposed in the through hole. The cap plate has a top side adapted to be printed thereon, a bottom side, and a peripheral portion on top of the cap seat flange. The cap body further includes a plurality of hooking arms that extend from the peripheral portion at the bottom side and that extend slidably through the mounting holes.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
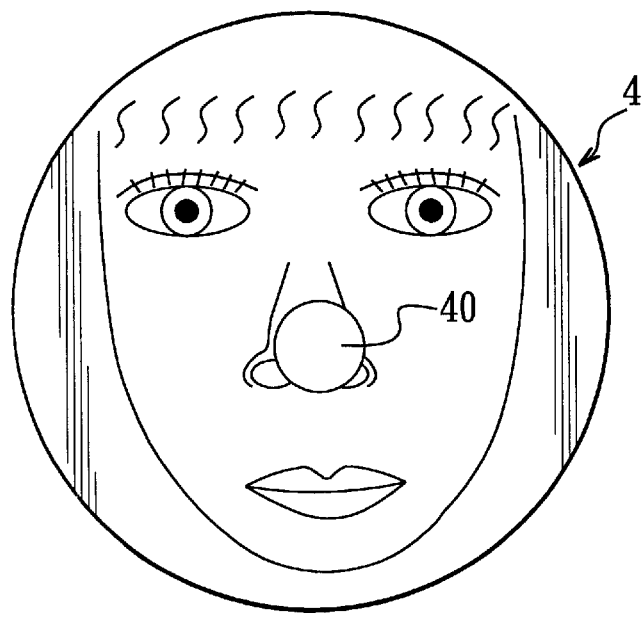
FIG. 1 is a schematic top view of a conventional optical disk.
Figure 2:
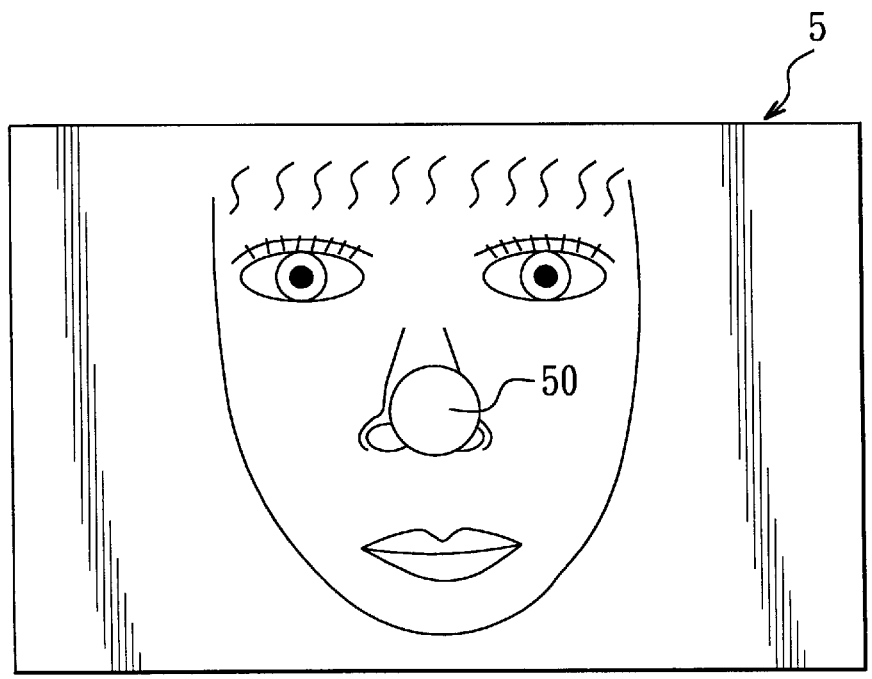
FIG. 2 is a schematic top view of another conventional optical disk.
Figure 3:
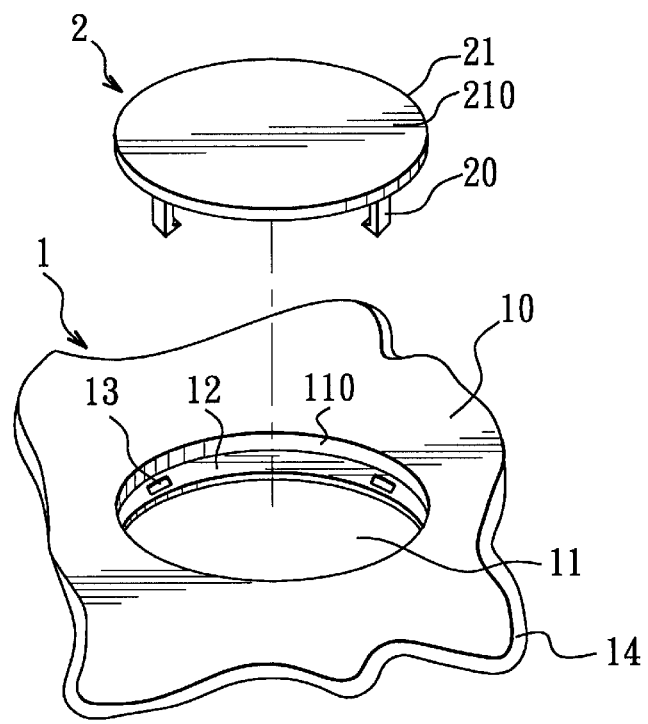
FIG. 3 is a fragmentary exploded perspective view of the preferred embodiment of an optical disk according to the present invention.
Figure 4:
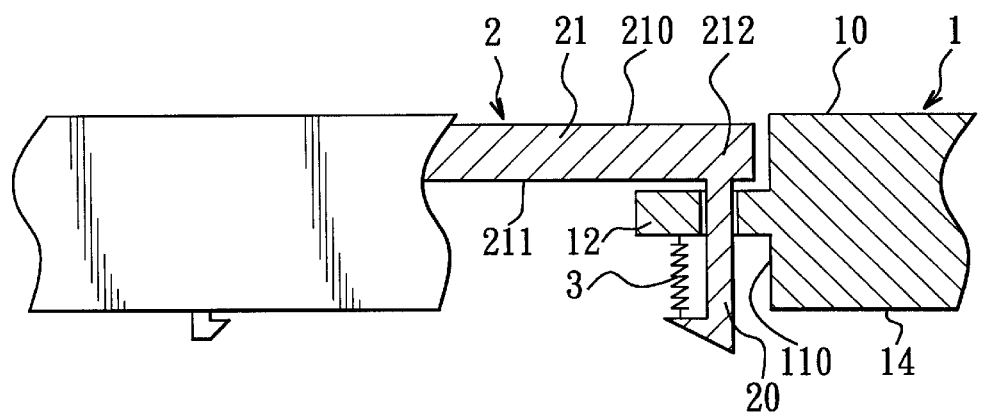
FIG. 4 is a fragmentary sectional schematic view of the preferred embodiment.

Referring to FIGS. 3 and 4, according to the preferred embodiment of this invention, an optical disk is shown to include a disk body 1, a cap body 2 and biasing means.

Figure 6:
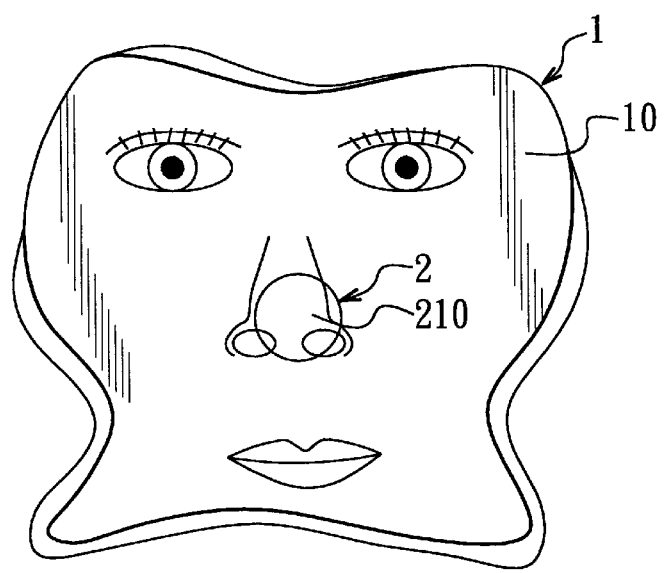
FIG. 6 is a fragmentary perspective view of the preferred embodiment.

The disk body 1, which can be circular or rectangular, has a first surface 10 adapted to be printed thereon, as shown in FIG. 6, a second surface 14 opposite to the first surface 10 and adapted to be store optical data in a known manner, and a central through hole 11 extending from the first surface 10 through the second surface 14 and confined by an annular hole surface 110. The disk body 1 further has a cap seat flange 12 that extends radially and inwardly from the hole surface 110 between the first and second surfaces 10, 14 and that is formed with a plurality of mounting holes 13 therethrough.

The cap body 2 includes a cap plate 21 disposed in the through hole 11. The cap plate 21 has a top side 210 adapted to be printed thereon, as shown in FIG. 6, a bottom side 211, and a peripheral portion 212 on top of the cap seat flange 12. The cap body 2 further includes a plurality of hooking arms 20 that extend from the peripheral portion 212 at the bottom side 211 and that extend slidably through the mounting holes 13.

The biasing means, which is connected to the cap seat flange 12 and the hooking arms 20, biases the cap body 2 to move the cap plate 21 toward the cap seat flange 12. The biasing means includes a plurality of expansion springs 3 connected respectively to the hooking arms 20.

Figure 5:
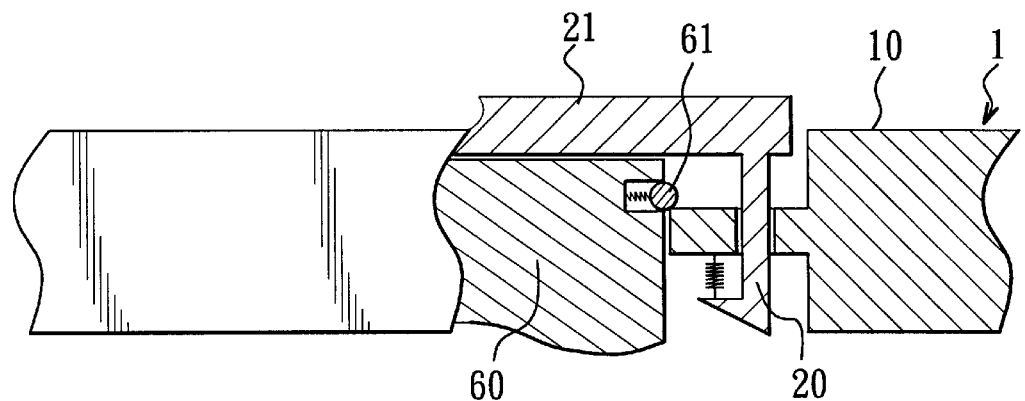
FIG. 5 is a fragmentary sectional schematic view of the preferred embodiment in a state of use.

During use, a rotary driving shaft 60 of an optical disk reader (not shown) is adapted to extend through the through hole 11 so as to push upwardly the cap plate 21 from a normal position, where the top side 210 of the cap plate 21 is generally flush with the first surface 10 of the disk body 1, to a position of use, where the cap plate 21 protrudes relative to the first surface 10 of the disk body 1, and the cap seat flange 12 engages a spring-loaded retainer 61 on the rotary driving shaft 60, as shown in FIG. 5. The optical disk of this invention thus has an additional printed area, e.g. the top side 210 of the cap plate 21, as shown in FIG. 6, when compared with the conventional optical disks 4, 5 described beforehand.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. An optical disk comprising:

a disk body having a first surface adapted to be printed thereon, a second surface opposite to said first surface and adapted to store optical data, and a central through hole extending from said first surface through said second surface and confined by an annular hole surface, said disk body further having a cap seat flange that extends radially and inwardly from said annular hole surface and that is formed with a plurality of mounting holes therethrough; and a cap body including a cap plate disposed in said through hole, said cap plate having a top side adapted to be printed thereon, a bottom side, and a peripheral portion on top of said cap seat flange, said cap body further including a plurality of hooking arms that extend from said peripheral portion at said bottom side and that extend slidably through said mounting holes.

2. The optical disk of claim 1, wherein said disk body is circular.

3. The optical disk of claim 1, wherein said disk body is rectangular.

4. An optical disk comprising:

a disk body having a first surface adapted to be printed thereon, a second surface opposite to said first surface and adapted to store optical data, and a central through hole extending from said first surface through said second surface and confined by an annular hole surface, said disk body further having a cap seat flange that extends radially and inwardly from said hole surface and that is formed with a plurality of mounting holes therethrough;

a cap body including a cap plate disposed in said through hole, said cap plate having a top side adapted to be printed thereon, a bottom side, and a peripheral portion on top of said cap seat flange, said cap body further including a plurality of hooking arms that extend from said peripheral portion at said bottom side and that extend slidably through said mounting holes; and biasing means connected to said cap seat flange and said hooking arms, for biasing said cap body to move said cap plate toward said cap seat flange.

5. The optical disk of claim 4, wherein said biasing means includes a plurality of expansion springs connected respectively to said hooking arms.

* * * * *